Patented Feb. 13, 1923.

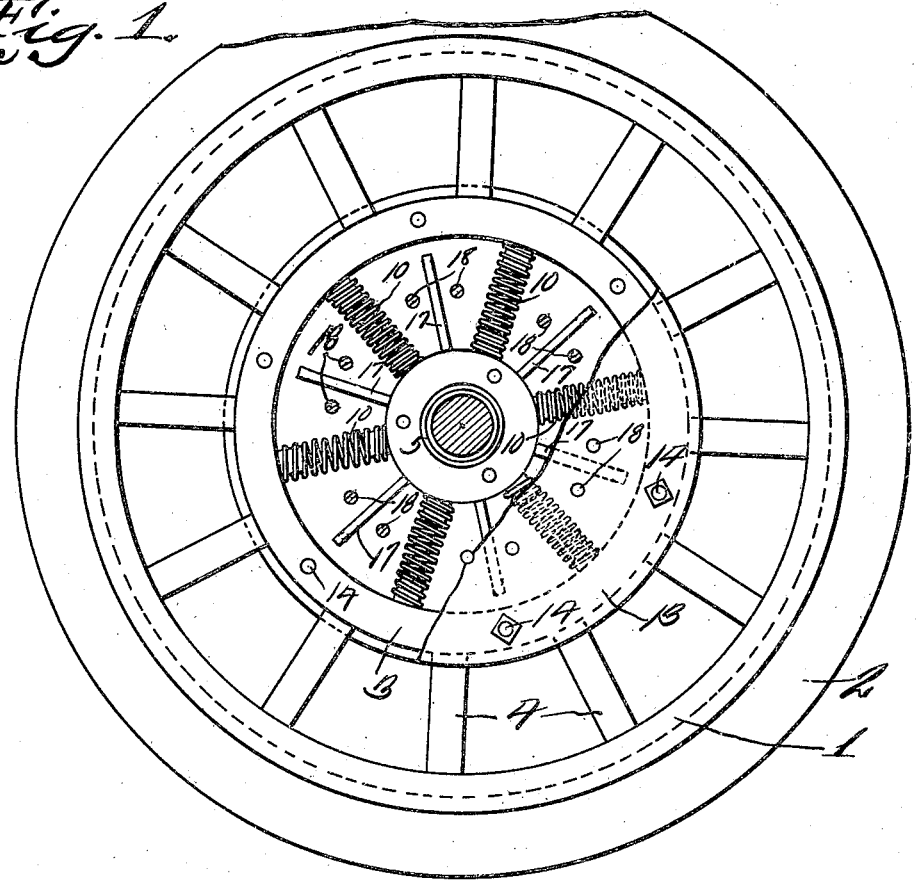
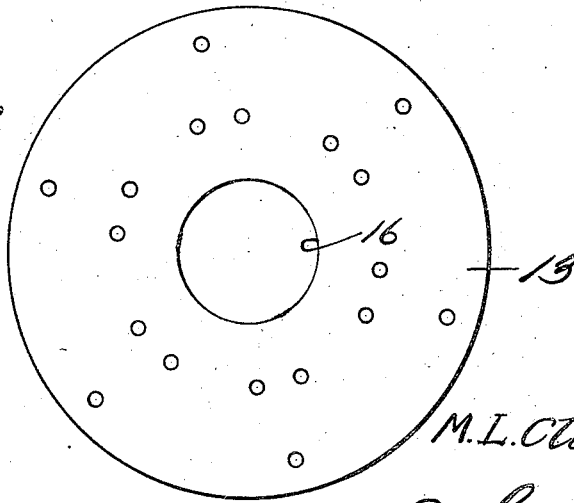

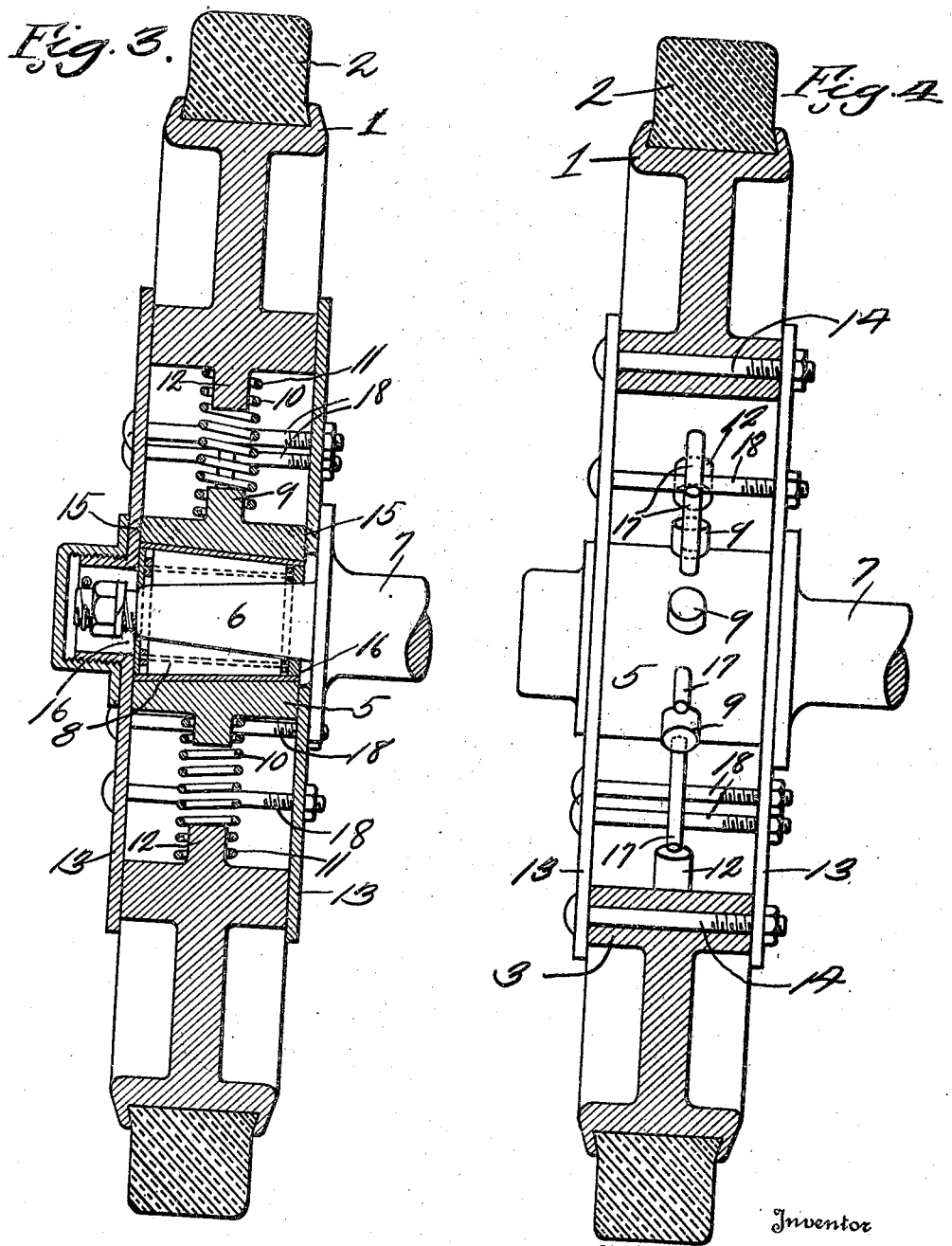

1,445,201

UNITED STATES PATENT OFFICE.

MARSHALL LUTHER CLARK, OF MARSLAND, NEBRASKA.

SPRING WHEEL.

Application filed June 29, 1922. Serial No. 571,674.

*To all whom it may concern:*

Be it known that I, MARSHALL LUTHER CLARK, a citizen of the United States, residing at Marsland, in the county of Dawes, State of Nebraska, have invented a new and useful Spring Wheel; and I do hereby declare the following to be a full, clear, and exact description of the invention, such as will enable others skilled in the art to which it appertains to make and use the same.

The invention relates to spring wheels and has for its object to provide a device of this character wherein the hub of the wheel is supported within an annular member by means of radially extending coiled springs. Also to provide the hub with spaced radially extending fingers which fingers are disposed between transversely extending bolts which limit the circumferential movement of the hub in relation to the body of the wheel. The fingers also form means for engaging the inner wall of the annular member upon excessive shocks.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a side elevation of the wheel, part of the cover plate being broken away.

Figure 2 is a plan view of one of the cover plates.

Figure 3 is a vertical sectional view through the wheel.

Figure 4 is a vertical sectional view through the wheel the hub member and plates being shown in elevation.

Referring to the drawing, the numeral 1 the rim of the wheel and 2 the tire carried thereby. Disposed concentrically with the rim 1 is an inner rim 3 which is connected to the rim 1 by means of the spokes 4. Disposed centrally of the wheel is a hub 5 for the reception of the spindles 6 of an axle 7, said spindle being rotatably mounted in roller bearings 8 within the hub. The outer periphery of the hub 5 is provided at spaced points with radially disposed lugs 9 which are preferably formed integral with the hub 5 and receive the inner ends of the coiled springs 10, which coiled springs are radially disposed and receive in their outer ends 11 radially disposed lugs 12 extending inwardly from the inner rim 3, therefore it will be seen that the hub 3 is resiliently mounted and that shocks will be taken up in the springs 10 as the wheel rolls over the ground and that by using coiled springs a greater resiliency is obtained than is possible where rubber alone is used. Secured to the opposite faces of the inner rim 3 are cover plates 13, which cover plates are secured to the inner rim 3 by means of the bolts 14 which pass through the rim 3. The plates 13 are in sliding engagement with the ends of the hub 5 and are provided with enlarged apertures 16 through which the spindle 6 extends, and which apertures allow the hub 5 to move incident to the wheel going over rough ground.

To prevent the hub from excessive circumferential movement and consequent disarrangement of the springs 10 the hub 5 is provided with radially extending arms 17, which arms have a limited circumferential movement between the bolts 18 located on each side of the arms 17. The arms also form means for cooperating with the inner side of the inner rim 3 upon excessive shocks for limiting the downward movement of the hub 5 in relation to the rim 3.

From the above it will be seen that a spring wheel is provided wherein the hub is resiliently supported on radially disposed springs and means is provided where the hub will be limited in circumferential movement thereby preventing displacement or collapsing of the coiled springs.

The invention having been set forth what is claimed as new and useful is:—

A spring wheel comprising an outer rim, an inner rim, a hub disposed centrally of the inner rim, plates carried by the opposite sides of the inner rim and overlying the outer sides of the hub, radially disposed coiled springs interposed between the hub and the inner rim, lugs carried by the hub and by the inner rim for the reception of the ends of the coiled springs, radially disposed arms carried by the hub, and transversely disposed bolts extending through the plates and located on each side of the radially disposed arms.

In testimony whereof I have signed my name to this specification in the presence of two subscribing witnesses.

MARSHALL LUTHER CLARK.

Witnesses:
W. T. GREGG,
GEO. H. YOUNG.